United States Patent [19]

Ito

[11] Patent Number: 4,520,543
[45] Date of Patent: Jun. 4, 1985

[54] COIL SPRING COMPRESSOR, WITH VERTICALLY ADJUSTABLE CLAMP CARRIAGE

[75] Inventor: Yuji Ito, Toyota, Japan

[73] Assignee: Toyota Jidosha Kabushiki Kaisha, Toyota, Japan

[21] Appl. No.: 453,839

[22] Filed: Dec. 28, 1982

[51] Int. Cl.³ .............................................. B23P 19/04
[52] U.S. Cl. ...................................... 29/227; 254/10.5
[58] Field of Search ................... 29/227, 225, 215–218; 254/10.5

[56] References Cited

U.S. PATENT DOCUMENTS

| 4,009,867 | 3/1977 | Diffenderfer | 29/227 |
| 4,295,634 | 10/1981 | Spainhour et al. | 254/10.5 |
| 4,395,020 | 7/1983 | Spainhour | 254/10.5 |

FOREIGN PATENT DOCUMENTS

| 56-109826 | 6/1981 | Japan . |
| 57-1630 | 1/1982 | Japan . |

*Primary Examiner*—James L. Jones, Jr.

*Attorney, Agent, or Firm*—Finnegan, Henderson, Farabow, Garrett and Dunner

[57] ABSTRACT

A coil spring compressor for compressing a coil spring during the assemblage of sub-assemblies of automotive suspension systems, in particular, of the MacPherson type. The coil spring compressor is of the type which includes a head plate positioned above a base and movable with respect to the base. The coil spring compressor is provided with a pair of guide bars pending from the head plate and on which a slidable clamp carriage is mounted. The clamp carriage carries a clamping mechanism having a pair of clamping assemblies facing each other and positioned at both sides of the coil spring. Each clamping assembly comprises a pair of clamping arms interconnected with each other so that the clamping fingers provided at the inner free ends of each arms extend toward the coil spring to be introduced between two successive turns of the coil spring. One of the clamping arms of each pair has an operating handle which serves to the vertical adjustment of the clamping finger position as well as to the opening and closing movement of the clamping arms.

3 Claims, 6 Drawing Figures

COIL SPRING COMPRESSOR, WITH VERTICALLY ADJUSTABLE CLAMP CARRIAGE

BACKGROUND OF THE INVENTION

1. Field of the Invention

The present invention relates to a coil spring compressor which is used in the assembly of subassemblies of automotive front or rear suspension systems, in particular, MacPherson type suspension systems.

2. Description of the Prior Art

Certain types of automotive suspension system such as of the MacPherson type comprise a suspension subassembly. The subassembly includes a strut formed by a lower tube. The strut includes a built-in shock absorber. A part of a piston of the shock absorber projects upward from the strut in a telescoping fashion. A coil spring is mounted in a compressed state around the strut between a lower spring seat integral with the strut and an upper spring seat fastened to the upper end of the piston of the shock absorber. Such a suspension subassembly is assembled separately and then mounted as a unit in a vehicle body.

During the assembly of a MacPherson type suspension subassembly, the coil spring is passed from above around the stanchion with its lower end abutting against the lower spring seat. The coil spring is then compressed by a suitable power tool to bring the upper end of the coil spring below the upper end of the piston of the shock absorber, so that the piston upper end protrudes beyond the coil spring upper end. The upper spring seat is then fastened to a threaded part of the upper end of the shock absorber piston by a nut. As a result, the coil spring is retained between the upper and lower spring seats in a compressed state.

Japanese Unexamined Utility Model Publication (Kokai) No. 56-109826 and Japanese Unexamined Patent Publication (Kokai) No. 57-1630 disclose a type of device for compressing the coil spring for the above-mentioned purposes. Such a coil spring compressor comprises a movable head plate positioned above a base. The head plate is mounted on the top of a vertically slidable drive shaft which is driven upward and downward by a rotary drive mounted on the base and driven by a motor through a clutch. The vertical movement of the head plate is guided by a pair of slide bars connected thereto and slidingly received within a pair of guide blocks secured to the base. The head plate is provided with a clamping mechanism having a plurality of clamping fingers which are designed to protract toward and retract from the coil spring mounted on the MacPherson strut. When the head plate is moved downward for a predetermined distance with the clamping fingers engaging the coil spring, the coil spring is compressed to a desired degree allowing the operator to fasten a nut to retain the upper spring seat. Normally, the clamping fingers should be so positioned that they engage between the first and second turns of the coil spring to permit the upper spring seat to be placed on the upper free end of the spring. The length and pitch of a coil spring in its free relaxed position vary according to the particular suspension system to be assembled. Thus, the vertical position of the clamping fingers must be adjusted depending on the particular coil spring used.

Japanese Unexamined Patent Publication No. 57-1630 discloses a position adjusting means comprising a plurality of limit switches. Japanese Unexamined Utility Model Publication No. 56-109826 discloses an adjusting mechanism employing cam mechanisms. The limit-switch adjusting mechanism is disadvantageous in that it entails a large number of limit switch positions in order accommodate coil springs of various sizes and that the positions of the limit switches must be altered each time the size of the coil spring is changed. Moreover, the electric circuit connecting the limit switches is complicated, making the maintenance thereof troublesome. The cam-mechanism adjusting mechanism suffers from similar disadvantages and, in some cases, requires alteration of the cam profile.

SUMMARY OF THE INVENTION

The object of the present invention is to provide a coil spring compressor in which the vertical position of the clamping fingers may be readily adjusted according to the size of the particular coil spring to be assembled.

The coil spring compressor according to the invention includes a movable head plate positioned above a base for movement toward and away from the base to compress a coil spring mounted on a suspension strut. According to the present invention, the coil spring compressor comprises a pair of spaced guide bars connected to and suspended from the movable head plate, a slidable clamp carriage mounted on the guide bars for sliding movement through at least a predetermined distance, and a pair of clamping assemblies mounted on the clamp carriage opposite to one another at both sides of the coil spring, each of the clamping assemblies comprising a pair of clamping arms pivoted to the clamp carriage and provided, respectively, with a clamping finger at the inner free end thereof, one of the clamping arms being provided with an operating handle, the clamping arms being interconnected with each other so that on actuating one arm by the handle the clamping fingers on both arms conjointly extend toward the coil spring to engage between any desired consecutive turns of the coil spring.

With this arrangement, the clamp carriage may be manually slid along the guide bars for adjustment to any required vertical position. This allows the clamping fingers to be inserted between any successive turns of the coil spring irrespective of the size of the coil spring employed. Thus, the adjustment of the clamping fingers can be performed in a quicker manner without resorting to limit switches and their requisite complex control circuit.

DESCRIPTION OF THE PREFERRED EMBODIMENT

Figure 1:
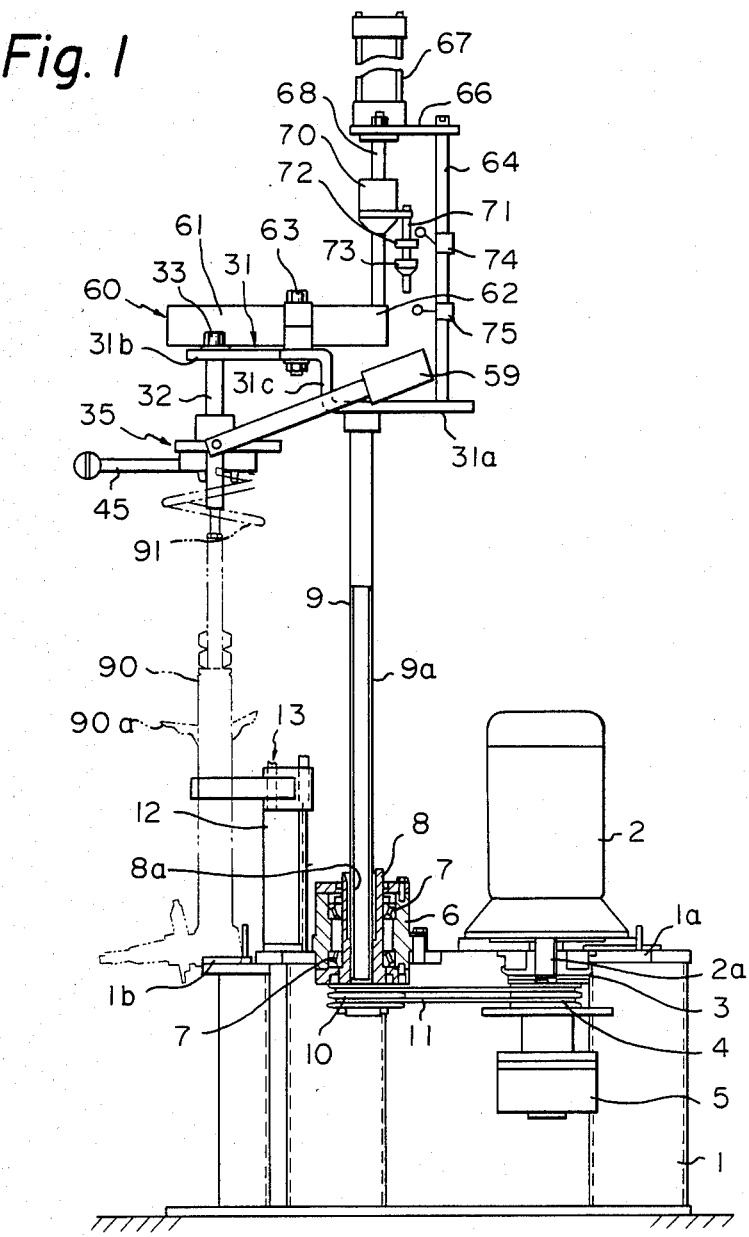
FIG. 1 is a left-hand side elevational view of an embodiment of the coil spring compressor according to the invention.
Figure 2:
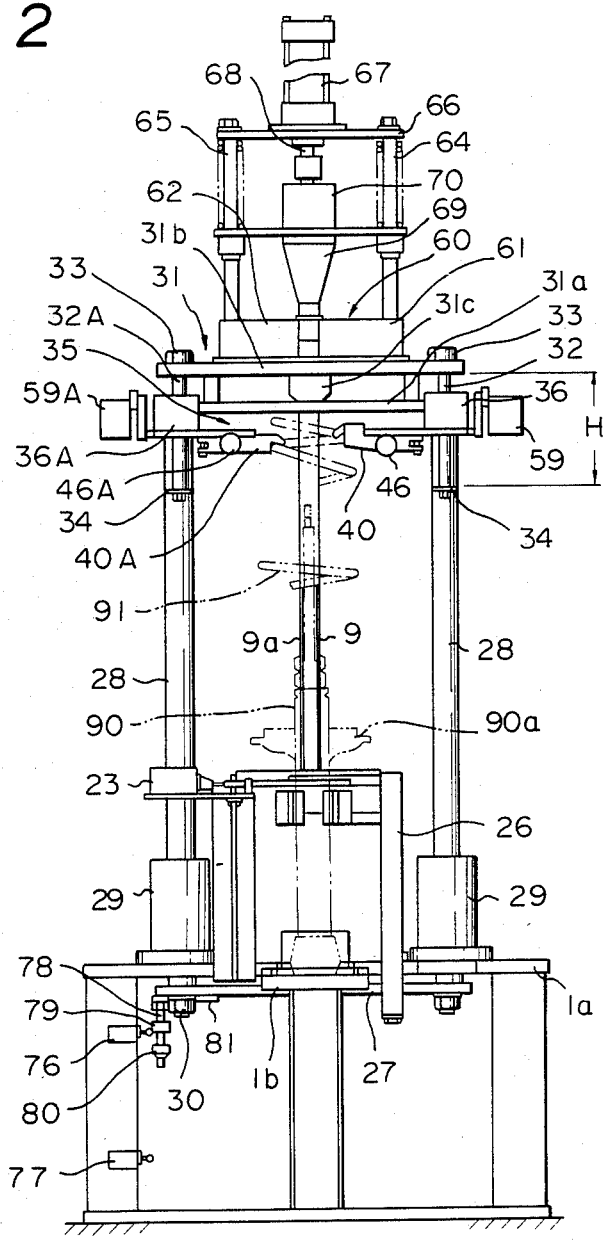
FIG. 2 is a front elevational view of the embodiment of FIG. 1.

Referring now to the drawings, FIGS. 1 and 2 illustrate an embodiment of the coil spring compressor according to the invention. In FIG. 1, the coil spring compressor includes a base 1 having a top plate 1a positioned at a predetermined level. An electric motor 2 is mounted on the top plate 1a with its shaft 2a projecting downward therefrom. The motor 2 is of the reversible type and its shaft 2a is connected to a driving pulley 4 through an electromagnetic clutch 3. The pulley 4 is mounted rotatably with brake 5 which cooperates with the clutch 3 to brake the pulley when the latter is disconnected from the motor shaft 2a. In front of the motor 2, the top plate 1a is provided with a tubular housing 6 in which a drive sleeve 8 is mounted for rotation by means of a pair of axial thrust bearings 7. The drive sleeve 8 has internally threaded portions 8a which are in meshing engagement with the externally threaded portions 9a of a vertically movable drive shaft 9 extending through the drive sleeve 8. The lower end of the sleeve 8 projects downward beyond the top plate 1a and a driven pulley 10 is connected thereto for rotation therewith. Endless belts 11 are entrained over the pulleys 4 and 10, so that when the driving pulley 4 turns in one direction, the driven pulley 10 is rotated together with the drive sleeve 8 causing the drive shaft 9 to move upward, and vice versa.

In front of the sleeve housing 6, a support 12 is rigidly fixed on the top plate 1a. This support 12 supports at its top a clamping mechanism 13 for clamping a strut 90 forming part of the MacPherson type automotive suspension system.

A bed plate 1b is mounted on the forward end of the top plate 1a underneath the clamping mechanism 13 for placing the strut 90 thereon.

Figure 3:
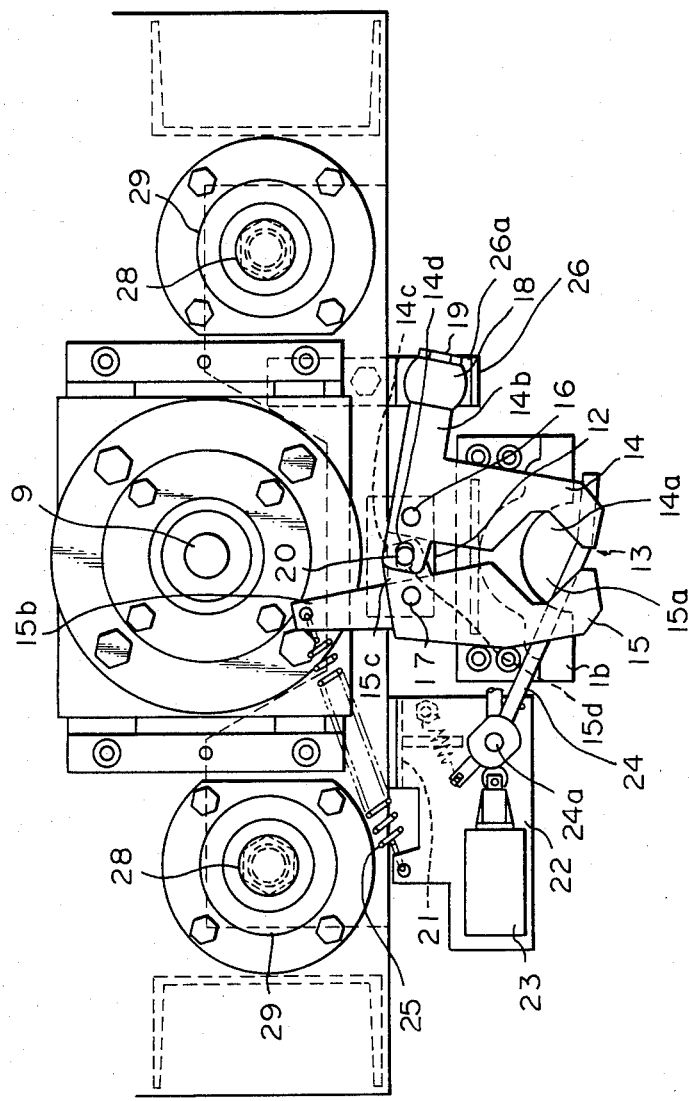
FIG. 3 is a top plane view of a strut clamping mechanism.

As shown in FIG. 3, the clamping mechanism 13 includes a pair of swingable clamping arms 14 and 15 pivoted to the support 12 by means of pins 16 and 17, respectively. The arms 14 and 15 are provided near the forward ends thereof with opposing triangular recesses 14a and 15a defining clamping jaws. The rear end of the left-hand arm 14 extends at a right angle to the remaining part of the arm to form a lever 14b, at the end of which a roller 18 is mounted rotatably by way of a pin 19. The rear end of the arm 14 opposite the lever portion 14b is formed into a coupling portion 14c having a slot 14d. The right-hand arm 15 is provided with a lever portion 15b and is also provided with a coupling portion 15c projecting toward the associated coupling portion 14c of the left-hand arm 14 and having a slot 15d. A coupling pin 20 is engaged within the slots 14d and 15d to couple the arms 14 and 15 together.

Figure 4:
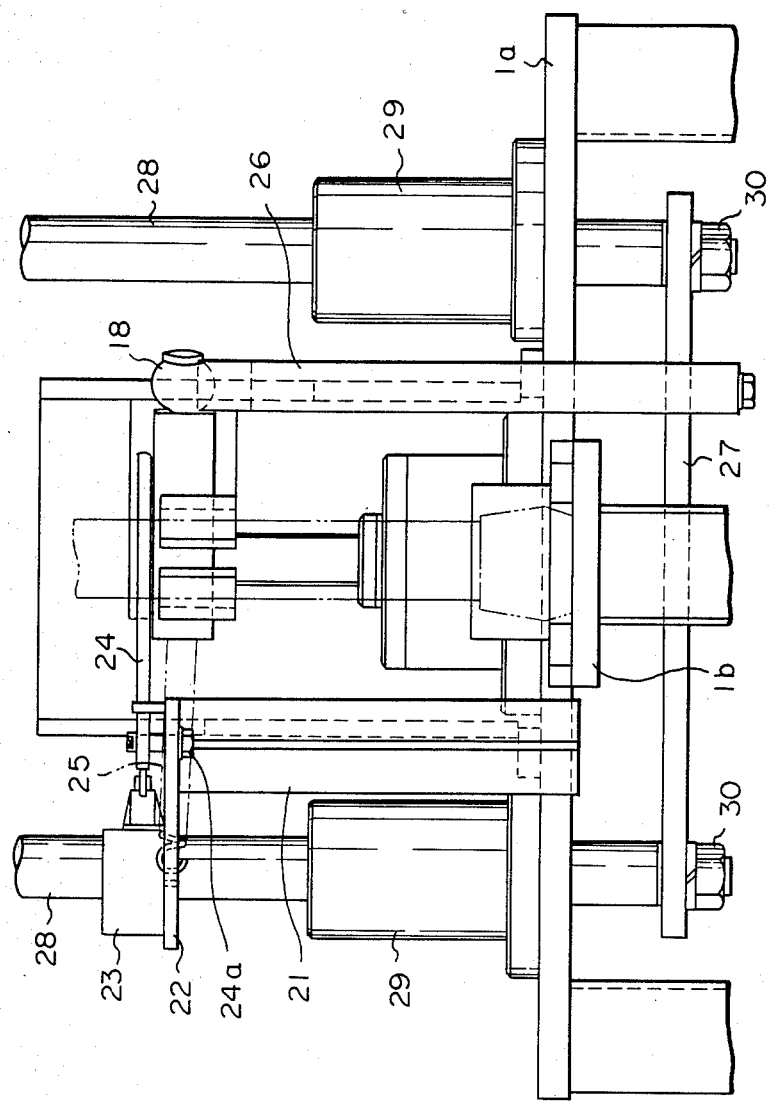
FIG. 4 is a front elevational view of the strut clamping mechanism of FIG. 3.

As shown in FIG. 4, a switching mechanism for the clamping arms 14 and 15 includes a T-shaped support 21 which is mounted to the top plate 1a and carries at its top a switch mounting plate 22. A sensing lever 24 is pivoted to the switch mounting plate 22 by a bolt 24a and is adapted to engage with a limit switch 23 which is connected to the motor 2 (see also FIG. 3).

Referring to both FIGS. 3 and 4, compression coil spring 25 is tensed between the switch mounting plate 22 and lever portion 15b of the clamping arm 15 so as to rotate the arm 15 about its pivot 17 in the counterclockwise direction as viewed in FIG. 3.

The closing and opening movement of the clamping arms 14 and 15 of the clamping mechanism 13 is controlled by a cam bar 26 connected to a cross member 27 which moves upward and downward together with the drive shaft 9. The cam bar 26 is provided at its top with a cam surface 26a which engages with the roller 18 of the clamping arm 14. The cam surface 26a is so arranged that when the cam bar 26 rises, it urges the roller 18 causing the arm 14 to swing about the pin 16 in the counterclockwise direction as viewed in FIG. 3, the movement of the arm 14 being transmitted through the coupling pin 20 to the other arm 15 causing it to swing in the clockwise direction about its pivot 17 against the action of the return spring 25 so that the arm 14 and 15 move away from each other to open the clamping mechanism 13. To the contrary, when the cam bar 26 lowers, the cam surface 26a releases the roller 18 allowing the arm 15 to return counterclockwise under the spring action so that the arm 14 rotates in the clockwise direction to close the clamping mechanism 13.

As shown in FIG. 2, a head plate 31 is rigidly connected to the top of the movable shaft 9 for upward and downward movement together with the shaft 9. A pair of vertical slide bars 28, 28 are connected at their upper ends to the head plate 31 by means of bolts (not shown) and extend therefrom vertically downward through the top plate 1a. The lower parts of the slide bars 28, 28 are received for sliding movement within a pair of guide blocks 29, 29 mounted on the top plate 1a. The lower ends of the slide bars 28, 28 projecting below the top plate 1a are connected together by means of the cross member 27 firmly fastened thereto by nuts 30, 30 (FIG. 4). Thus, the drive shaft 9, head plate 31, slide bars 28, 28 and cross member 27 form together a vertically movable frame which moves upward and downward guided by the guide blocks 29, 29 as the drive shaft 9 moves up and down.

Referring to FIGS. 1 and 2, head plate 31 comprises a lower rear part 31a connected to the drive shaft 9 and slide bars 28, 28, an upper part 31b extending at a higher level, and an intermediate part 31c connecting the two parts 31a and 31b. Thus, the head plate 31 has a Z-shaped cross-section leaving a relatively free frontal space thereunder.

A pair of guide bars 32 and 32A are suspended from the upper frontal part 31b of the head plate 31 and are rigidly connected thereto at their upper ends by means of nuts 33, 33. A carriage 35 for the clamping mechanism is slidably mounted on the guide bars 32 and 32A by means of bosses 36 and 36A forming part of the slidable carriage 35 and having cylindrical apertures in which the guide bars 32 and 32A are passed. A pair of stops 34, 34 are provided at the lower ends of the guide bars 32 and 32A to prevent the carriage 35 from being slipped down out of the bars 32 and 32A. The guide bars 32 and 32A have a predetermined length so that the carriage 35 can move along the guide bars through a height H as shown in FIG. 2.

Figure 5:
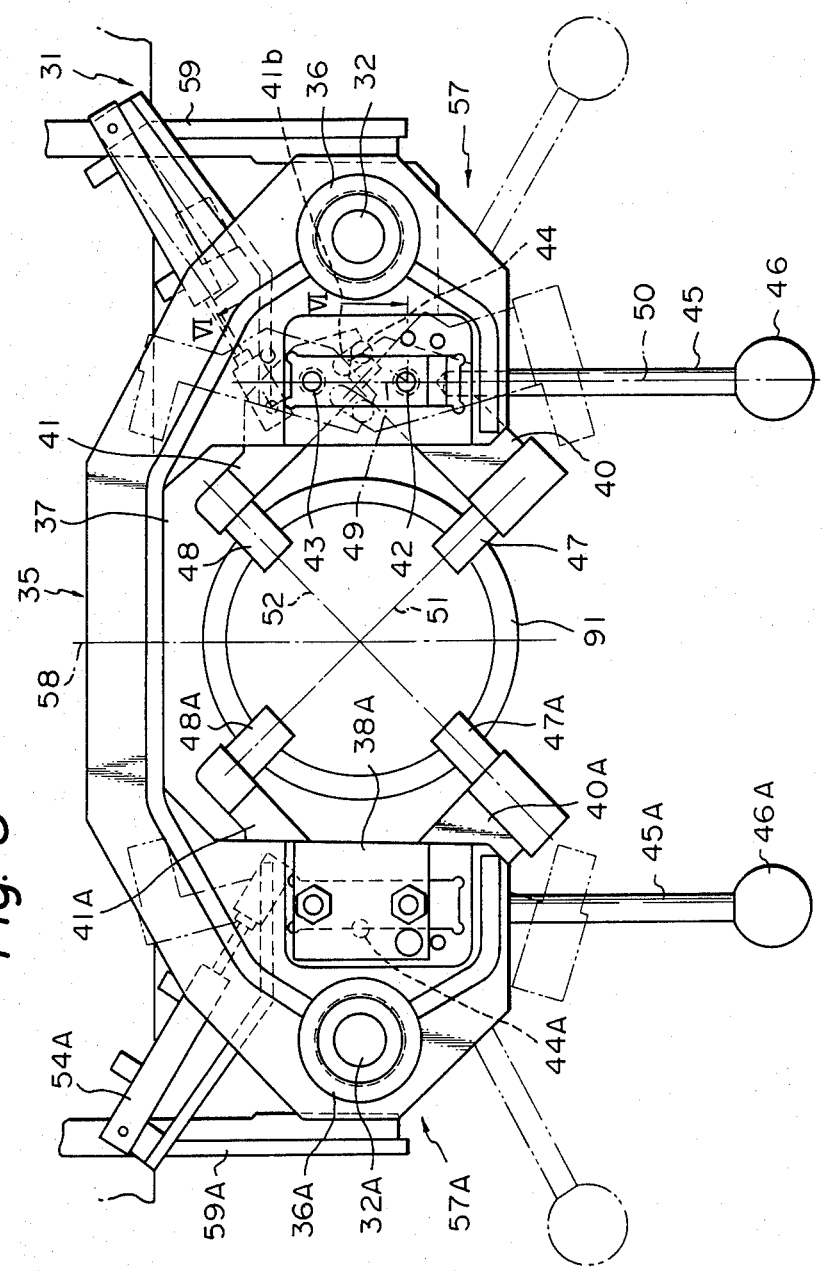
FIG. 5 is a top plan view of a coil spring clamping mechanism.

As shown in FIG. 5, the clamp carriage 35 is generally C-shaped and has a roughly square recess 37 having a sufficient size not to interfere with a coil spring 91 to be assembled. The clamp carriage 35 carries left-hand clamping assembly and a right-hand clamping assembly indicated generally by the reference numerals 57 and 57A, respectively.

Figure 6:
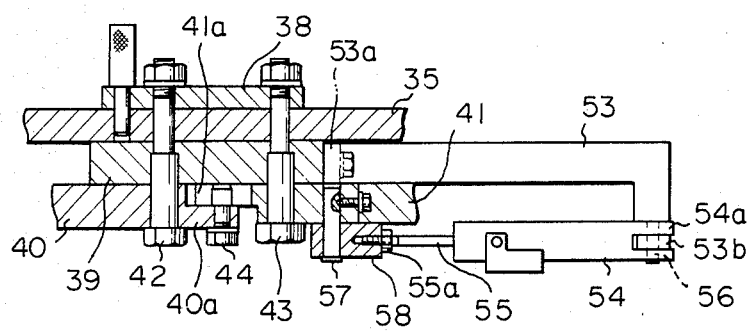
FIG. 6 is a cross-sectional view taken along the line VI—VI of FIG. 5.

As shown in FIG. 6, the left-hand clamping assembly 57 includes an upper plate 38 and a lower plate 39 positioned on the upper and lower sides of the carriage 35. Front and rear clamping arms 40 and 41 are arranged under the lower plate 39 parallel to the carriage 35. The upper plate 38, carriage 35, lower plate 39, and front clamping arm 40 are assembled together by a bolt 42, while the upper plate 38, carriage 35, lower plate 39, and front clamping arm 41 are assembled together by a bolt 43. Thus, the front and rear clamping arms 40 and 41 are pivotable about the bolts 42 and 43 parallely to the carriage 35.

As shown in FIG. 6, the opposite ends of the clamping arms 40 and 41 located between the bolts 42 and 43 are recessed to a half of their thickness to form ledged portions 40a and 41a which slidingly engage with each other. The ledged portions 41a is provided with an elongated aperture or slot 41b (FIG. 5) in which engages a coupling pin 44 mounted to the ledged portion 40a. With this arrangement, when the front clamping arm 40 is turned in one direction about its bolt 42, the rear clamping arm 41 rotates in the opposite direction about the bolt 43. The front and rear clamping arms 40 and 41 are provided with clamping fingers 47 and 48 serving to engage and compress the coil spring 91. The rear clamping finger 48 is positioned higher than the front clamping finger 47 by a quarter of the pitch of the coil spring 91.

The front clamping arm 40 is provided connected thereto with a handle 45 having a ball end 46 (FIG. 5). The mutual positional relationship of the front and rear clamping arms 40 and 41 and handle 45 is such that, when an axis 50 of the handle 45 is aligned with the line 49 passing through the axes of the bolts 42 and 43, the clamping fingers 47 and 48 are brought inward toward the center of the C-shaped carriage 35 with the axis 51 of the front clamping finger 47 intersecting at a right angel with the axis 52 of the rear clamping finger 48.

The left-hand clamping assembly 57 further includes a pneumatic actuator comprising a pneumatic cylinder 54. To provide a support for the cylinder 54, a bracket 53 is bolted at its front end 53a to the outer end of the lower plate 39, the rear end of the bracket 53 being bent downward and then horizontally to form a free end 53b to which the forked end 54a of the cylinder 54 is connected by means of a pin 56. The threaded end 55a of an output rod 55 of the cylinder 54 is screwed into a block 58 which is rotatably mounted to the rear clamping arm 41 by a pin 57 at the vicinity of the bolt 43. The pneumatic cylinder 54 is connected to a suitable source of compressed air via a switching valve (not shown) and is so designed that when its output rod 55 is retracted, the internal working chamber is connected to the drain port so that the output rod can be pulled out by exerting a manual force thereon.

Adjacent to and inward of the guide bar 32A, the slidable carriage 35 carries a right-hand clamping assembly indicated generally by the reference numeral 57A (FIG. 5). Parts and members pertaining to the right-hand clamping asdembly are similar to those of the left-hand clamping assembly and are arranged in a symmetrical manner with respect to the center line 58. Thus, these parts and members are indicated in the drawings by the reference numerals for the parts and numbers of the left-hand clamping assembly with a suffix A. The right-hand clamping assembly 57A includes among others a front clamping arm 40A provided with a ball-ended operating handle 45A and a rear clamping arm 41A connected to a pneumatic cylinder 54A. The clamping arms 40A and 41A are provided with clamping fingers 47A and 48A similar to the left-hand clamping fingers 47 and 48. The clamping finger 48A of the rear arm 41A is positioned at a lower level by a quarter of the pitch of coil spring 91 than that of the clamping finger 48 of the left-hand rear arm 41. Similarly, the clamping finger 47A is positioned lower by a quarter of the pitch than the finger 48A.

As best shown in FIG. 5, the carriage 35 is provided at both extremities thereof with counterweights 59 and 59A to reduce the manual force required for sliding the carriage 35 upward and downward along the guide bars 32 and 32A.

Referring again to FIGS. 1 and 2, in order to firmly hold an upper spring seat for retaining the coil spring during the assembly of the suspension system, the head plate 31 is provided with a conventional upper spring seat clamp 60 comprising clamping arms 61 and 62 mounted pivitably to the plate 31 by a bolt 63. The clamping arms 61 and 62 are adapted to be actuated by a wedged-shaped cam plate 69 engaging the rear ends of the clamping arms and connected through a coupling member 70 to an output rod 68 of a pneumatic cylinder 67 mounted on a cylinder support plate 66. The plate 66 is supported by a pair of columns 64 and 65 rigidly connected to the rear part of the head plate 31. The arrangement is such that as the rod 68 of the cylinder 67 moves down the cam plate 69 engages the rear parts of the clamping arms 61 and 62 causing the clamp 60 to open, and vice versa.

The pneumatic cylinder 67 is connected to a suitable compressed air source and is adapted to be controlled by a control valve, not shown, which, in turn, is controlled by a pair of limit switches 74 and 75 mounted on the support column 64. Connected to the coupling member 70 is a bar 71 on which a pair of dogs 72 and 73 are mounted. The dogs 72 and 73 are designed such that on supplying the compressed air into one of the pressure chambers of the cylinder 67 to move the cam plate 69 into engagement with the clamping bars, the dog 73 is brought into contact with the limit switch 75 causing the valve to turn off, whereby the downward movement of the cam bar 69 is stopped, and on supplying the air into another pressure chamber, the cam bar goes up together with the dog 72 which then contacts the limit switch 74 to turn off the air supply.

The base 1 is provided with an upper limit switch 76 and a lower limit switch 77 which cooperate with a pair of dogs 79 and 80 secured to a bar 78 suspended from a plate 81 attached to the cross member 27. These limit switches 76 and 77 serve to limit the upper and lower extremities of the travel of the threaded drive shaft 9. As the motor 2 rotates in one direction to lower the drive shaft 9 together with the integral cross member 17, the dog 80 engages the lower limit switch 77 which turn off the motor 2 and energizes the brake 5. On the contrary, as the motor 2 rotates in the reverse direction to lift the drive shaft 9, the dog 79 engages with the upper limit switch 76 thereby to stop the upward movement of drive shaft 9.

The operation of the coil spring compressor according to the invention is as follows.

At the outset of each cycle of the assemble operation of suspension system, the cam bar 26 is in contact with the roller 18 so that the clamping arms 14 and 15 of the clamping mechanism 13 are opened from each other. First, a strut 90 forming part of the suspension system to be assembled is introduced between the clamping arms 14 and 15 and is placed on the bead plate 1b as shown by the phantom line in FIGS. 1 and 2. On being inserted, the strut 90 engages the sensing lever 24 causing it to swing to actuate the switch 23 which in turn actuates the motor 2 to rotate in the forward direction. This causes the drive sleeve 8 to turn in the forward direction through the pulley 4, belt 11, the pulley 10, so that the drive shaft 9 begins to be lowered together with the head plate 31, carriage 35, and cam bar 26. The downward movement of the cam bar 26 releases the pressure on the roller 18, allowing the clamping arms 14 and 15 to swing inward under the action of the spring 25 so that the strut 90 is clamped and retained on the bed plate 1b. The closure of the clamping mechanism 13 is sensed by a switch (not shown) which disconnects the clutch 3 and energizes the brake 5 to restrain the drive sleeve 8 and, hence, the drive shaft 9.

Then the operator places a coil spring 91 on the lower spring seat 90a of the strut 90 and an upper spring seat thereon. Thereafter, the operator grips the handle 45 and 45A by hand and slides the carriage 35 upward and downward along the guide bars 32 and 32A to adjust the vertical position of the carriage in such a manner that the clamping fingers 47, 47A, 48, and 48A are leveled between the first and second turns of the coil spring 91. The operator then pulls the handles 45 and 45A together as shown by the solid line in FIG. 5, whereby the front clamping arms 40 and 40A move conjointly with the rear arms 41 and 41A toward the spring 91 so that the four clamping fingers are introduced between the first and second turns of the coil spring 91. The manual movement of the handles 45 and 45A is not hindered by the pneumatic cylinders 54 and 54A because the internal pressure chambers of the cylinders are connected to the drain ports at the retracted position of the cylinders as described before.

On turning on a manual switch, the motor is rotated once again in the forward direction causing the drive shaft 9 to move further downward so that the clamping fingers 47, 47A, 48, 48A are brought into contact with the coil spring and compresses the same. The downward movement of the drive shaft 9 is accompanied by a similar movement of the members integral therewith such as the head plate 31, upper spring seat clamp 60, air cylinder 67, and cross member 27. When the drive shaft 9 has traveled through a predetermined distance, the lower dog 80 attached to the cross member 27 abuts against the lower limit switch 77 to turn off the motor 2. Simultaneously, a suitable switching mechanism, not shown, actuates the pneumatic cylinder 67 to bring the cam plate 69 into engagement with the clamping arms 61 and 62 to close them together, so that the upper spring seat is clamped by the clamp 60. Then, the operator screws a nut onto the upper threaded end of the strut 90 in a conventional manner to retain the upper spring seat thereon.

After the coil spring 91 has been assembled to the strut 91 in the foregoing manner, the operator turns on a switch (not shown) associated with the penumatic cylinder 67 to release the upper spring seat from the clamping mechanism 60. Then, the operator actuates a switch (not shown) for the motor 2 to turn it in the reverse direction and turns on a switch (not shown) for supplying the compressed air to the releasing cylinders 54 and 54A. The drive shaft 9 begins shifting upward together with the clamp carriage 35, and the cylinders 54 and 54A exert a pull on the rear clamping arms 41 and 41A. However, as there exists a considerable frictional force acting between the clamping fingers and the coil spring during the initial return travel of the carriage 35 in which travel the coil spring is still in a compressed state, the clamping fingers remain engaged with the coil spring. As the drive shaft 9 is raised further, the frictional force reduces so that the clamping fingers are finally disengaged from the coil spring 91, whereby the compressive force applied on the spring is released. The drive shaft 9 continues its upward movement until the upper dog 79 associated with the cross member 27 comes into contact with the upper limit switch 76 whereupon the motor 2 is turned off. In this stage, the cam bar 26 is brought into engagement with the roller 18 so that the clamping mechanism 13 is released, thereby allowing the assembled suspension system to be taken out of the machine.

I claim:

1. An improved coil spring compressor for use in the assemblage of automotive suspension systems, said coil spring compressor being of the type in which a movable head plate is provided above a base for movement toward and away from said base to compress a coil spring mounted on a suspension strut which forms part of the suspension system to be assembled and which is secured to said base, wherein the improvement comprises:

a pair of spaced guide bars connected to and pending from said movable head plate;

a slidable clamp carriage mounted on said guide bars for sliding movement through at least a predetermined distance; and a pair of clamping assemblies mounted on said clamp carriage opposite with one another at both sides of said coil spring, each of said clamping assemblies comprising a pair of clamping arms pivoted to the clamp carriage and provided, respectively, with a clamping finger at the inner free end thereof, one of said clamping arms being provided with an operating handle, said clamping arms being interconnected with each other so that on actuating said one arm by said handle the clamping fingers on both arms conjointly extend toward the coil spring to engage between any desired successive turns of the coil spring.

2. An improved coil spring compressor according to claim 1, wherein said clamp carriage comprises a C-shaped carriage.

3. An improved coil spring compressor according to claim 2, further comprising means connected to the other clamping arms for automatically retracting said clamping fingers from said coil spring on completion of the assembly.

* * * * *